US012704826B2

(12) United States Patent
Aizawa et al.

(10) Patent No.: US 12,704,826 B2
(45) Date of Patent: Aug. 11, 2026

(54) DISPLAY DEVICE, AND DISPLAY METHOD

(71) Applicant: FANUC CORPORATION, Yamanashi (JP)

(72) Inventors: Tomoyuki Aizawa, Yamanashi (JP); Junichi Tezuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 647 days.

(21) Appl. No.: 18/042,689

(22) PCT Filed: Sep. 17, 2021

(86) PCT No.: PCT/JP2021/034384

§ 371 (c)(1),
(2) Date: Feb. 23, 2023

(87) PCT Pub. No.: WO2022/065252

PCT Pub. Date: Mar. 31, 2022

(65) Prior Publication Data

US 2023/0315040 A1 Oct. 5, 2023

(30) Foreign Application Priority Data

Sep. 24, 2020 (JP) ................................ 2020-159619

(51) Int. Cl.
*G05B 19/19* (2006.01)
*B23Q 15/18* (2006.01)
(Continued)

(52) U.S. Cl.
CPC ........... *G05B 19/19* (2013.01); *G05B 19/401* (2013.01); *B23Q 15/18* (2013.01);
(Continued)

(58) Field of Classification Search
CPC .............. G05B 19/401; G05B 19/4093; G05B 19/418; G05B 2219/35137; G05B 2219/35143; B23Q 15/18
(Continued)

(56) References Cited

U.S. PATENT DOCUMENTS 4,646,228 A * 2/1987 Ikeda ................. G05B 19/4069 700/87
5,323,325 A * 6/1994 Izumiya ............. G05B 19/4063 714/E11.204
(Continued)

FOREIGN PATENT DOCUMENTS

CN 103454969 A 12/2013
CN 104160345 A 11/2014
(Continued)

OTHER PUBLICATIONS

International Search Report issued in PCT/JP2021/034384; mailed Nov. 30, 2021.

*Primary Examiner* — Ronald D Hartman, Jr.
(74) *Attorney, Agent, or Firm* — Studebaker Brackett PLLC

(57) ABSTRACT

The objective of the present invention is to display a correspondence relationship between a specific location in a machining program and specific position in a machining trajectory in such a way as to be immediately understandable, in a display device capable of simultaneously displaying the machining program and the machining trajectory. Acquired position data of a tool, and a character string from a machining program are saved in association with one another, a part of interest of a displayed tool machining trajectory is selected, and a program block comprising a character string from the machining program associated with the selected part of the machining trajectory is selected and is displayed on the displayed machining program, thereby making the relationship between the operation of the tool and the machining program more readily understandable.

4 Claims, 7 Drawing Sheets

(51) Int. Cl.
*G05B 19/401* (2006.01)
*G05B 19/4093* (2006.01)

(52) U.S. Cl.
CPC .................... *G05B 19/4093* (2013.01); *G05B 2219/35137* (2013.01); *G05B 2219/35143* (2013.01); *G05B 2219/35349* (2013.01)

(58) Field of Classification Search
USPC .......................................................... 700/184
See application file for complete search history.

(56) References Cited

U.S. PATENT DOCUMENTS 5,359,530 A * 10/1994 Matsumura et al. ........................ G05B 19/4069
5,610,842 A * 3/1997 Seki et al. ......... G05B 19/4069
7,174,225 B2 * 2/2007 Dolansky ........... G05B 19/4069 700/26
9,454,144 B2 * 9/2016 Tezuka et al. ....... G05B 19/182
9,483,042 B2 * 11/2016 Sato ................... G05B 19/4062
2015/0105590 A1 4/2015 Xiao
2015/0105890 A1 * 4/2015 Stochosky ....... G05B 19/40937 700/98
2017/0160724 A1 6/2017 Kikata et al.
2018/0107192 A1 * 4/2018 Endo et al. ........ G05B 19/4068

FOREIGN PATENT DOCUMENTS

| | | | |
|---|---|---|---|
| CN | 109581965 | A | 4/2019 |
| CN | 110320861 | A | 10/2019 |
| DE | 10 2018 215 634 | A1 | 3/2019 |
| JP | H03-058202 | A | 3/1991 |
| JP | H06-059717 | A | 3/1994 |
| JP | H08-194514 | A | 7/1996 |
| JP | 2014-126939 | A | 7/2014 |
| JP | 2018-045727 | A | 3/2018 |
| JP | 2018-067109 | A | 4/2018 |
| WO | 2016/035869 | A1 | 3/2016 |

* cited by examiner

FIG. 4

MACHINING PROGRAM DISPLAY 233

| |
|---|
| X28.5453Y6.5237Z-22.9919C246.1065 |
| X28.2498Y6.6338Z-22.9485C249.0476 |
| X27.9507Y6.7313Z-22.8136C251.9887 |
| X27.6484Y6.8167Z-22.8598C254.9292 |
| X27.3436Y6.8922Z-22.8136C257.8701 |
| X27.036Y6.9555Z-22.7666C260.811 |
| X26.8132Y7.0089Z-22.7688C260.7218 |
| X26.5453Y7.0553Z-22.7686C260.6357 |
| X26.5453Y7.0997Z-22.7666C260.5533 |

FIG. 6

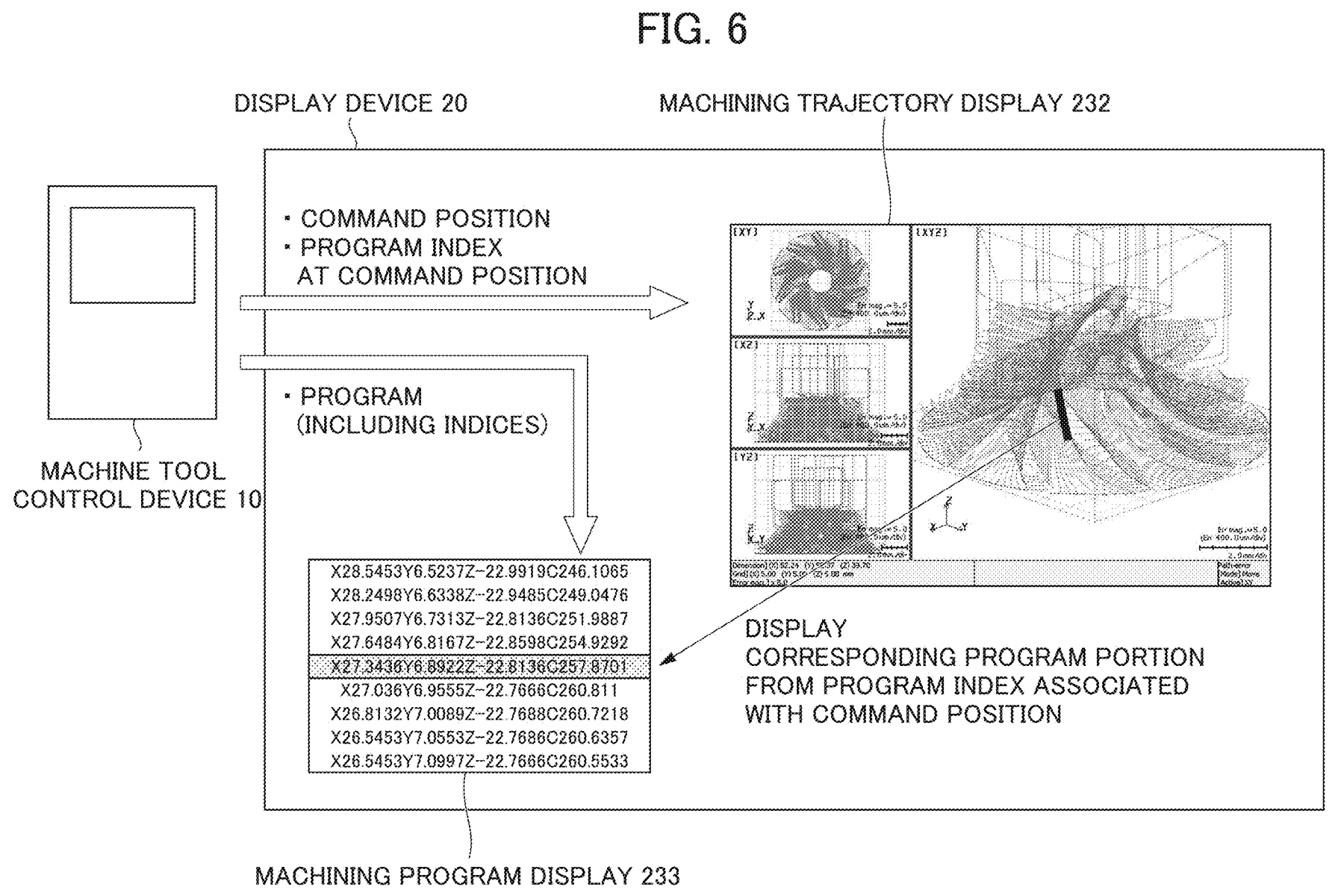

DISPLAY DEVICE 20

MACHINING TRAJECTORY DISPLAY 232

MACHINE TOOL CONTROL DEVICE 10

- COMMAND POSITION
- PROGRAM INDEX AT COMMAND POSITION

- PROGRAM (INCLUDING INDICES)

X28.5453Y6.5237Z-22.9919C246.1065
X28.2498Y6.6338Z-22.9485C249.0476
X27.9507Y6.7313Z-22.8136C251.9887
X27.6484Y6.8167Z-22.8598C254.9292
X27.3436Y6.8922Z-22.8136C257.8701
X27.036Y6.9555Z-22.7666C260.811
X26.8132Y7.0089Z-22.7688C260.7218
X26.5453Y7.0553Z-22.7686C260.6357
X26.5453Y7.0997Z-22.7666C260.5533

DISPLAY CORRESPONDING PROGRAM PORTION FROM PROGRAM INDEX ASSOCIATED WITH COMMAND POSITION

MACHINING PROGRAM DISPLAY 233

FIG. 7

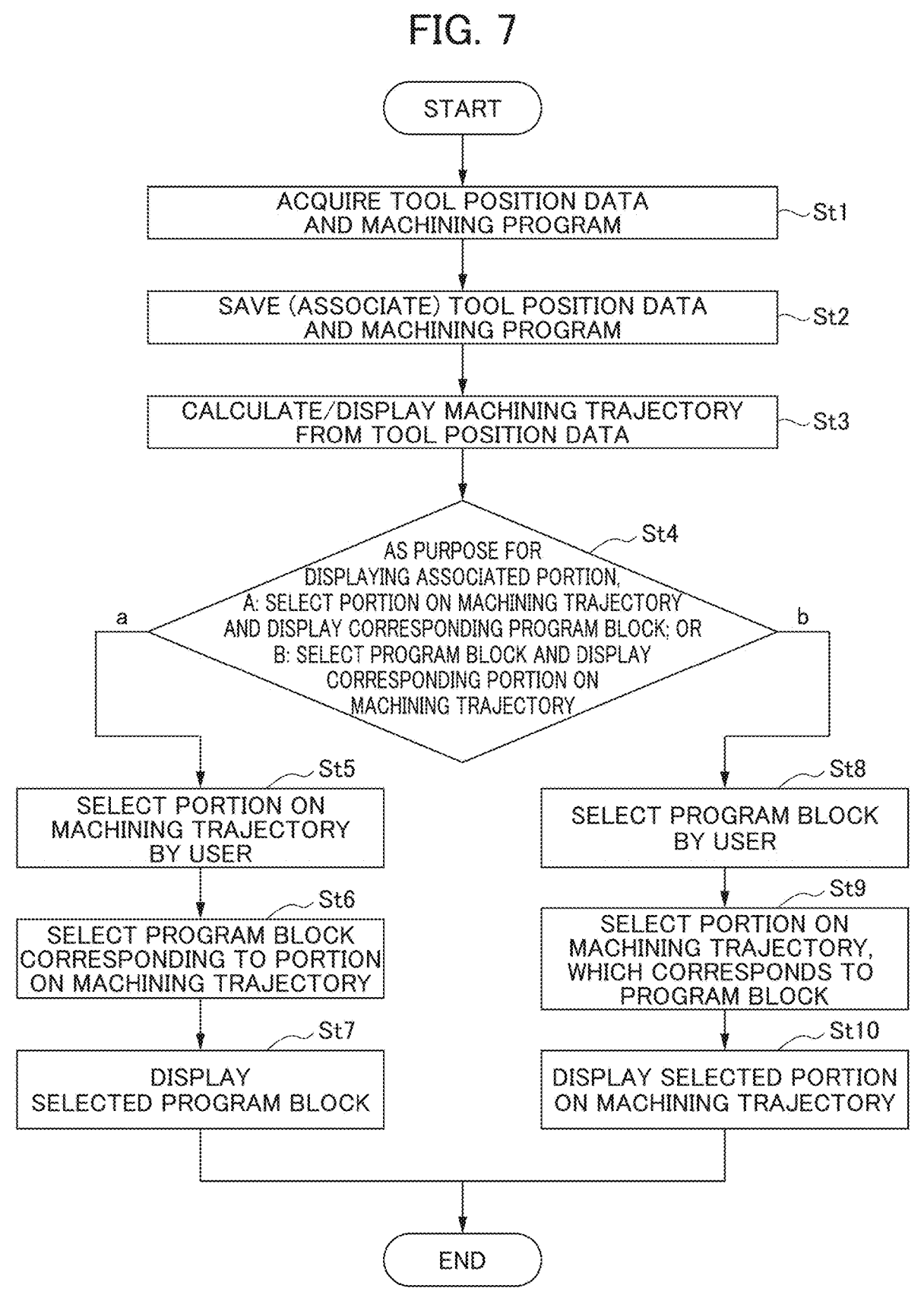

START

ACQUIRE TOOL POSITION DATA AND MACHINING PROGRAM ~St1

SAVE (ASSOCIATE) TOOL POSITION DATA AND MACHINING PROGRAM ~St2

CALCULATE/DISPLAY MACHINING TRAJECTORY FROM TOOL POSITION DATA ~St3

St4: AS PURPOSE FOR DISPLAYING ASSOCIATED PORTION, A: SELECT PORTION ON MACHINING TRAJECTORY AND DISPLAY CORRESPONDING PROGRAM BLOCK; OR B: SELECT PROGRAM BLOCK AND DISPLAY CORRESPONDING PORTION ON MACHINING TRAJECTORY a

St5: SELECT PORTION ON MACHINING TRAJECTORY BY USER

St6: SELECT PROGRAM BLOCK CORRESPONDING TO PORTION ON MACHINING TRAJECTORY

St7: DISPLAY SELECTED PROGRAM BLOCK b

St8: SELECT PROGRAM BLOCK BY USER

St9: SELECT PORTION ON MACHINING TRAJECTORY, WHICH CORRESPONDS TO PROGRAM BLOCK

St10: DISPLAY SELECTED PORTION ON MACHINING TRAJECTORY

END

DISPLAY DEVICE, AND DISPLAY METHOD

TECHNICAL FIELD

The present invention relates to a display device and a method for displaying a machining program and a machining trajectory in association with each other in a machine such as a machine tool.

BACKGROUND ART

A machine tool has a problem that in a case where a machining defect has been caused in a cut/ground machined product, a user does not know where on a machining program the machining defect has been caused. Particularly, in a case of a machining program including fine line segments, it is difficult to specify a location on the machining program, where the machining defect has been caused.

In order to solve the above-described problem, a technique of displaying a relationship between a machining program and a machining position or status has been conventionally known.

In Patent Document 1, in simulation of a tool machining path, a machining program and the machining path are displayed corresponding to each other, and a name is assigned to a program step of the machining program after the simulation of the machining path has been temporarily stopped. In this manner, a program editing/updating process is efficiently performed.

In Patent Document 2, in an NC device that operates a tool according to an NC program to perform predetermined machining for a workpiece, tool motion generated by analysis of the NC program and tool motion obtained by actual execution of the NC program are displayed so as to overlap with each other. In this manner, the NC program is verified so that an accurate program can be obtained.

In Patent Document 3, even in machining for simultaneously performing rotation of a workpiece and movement of a tool in the directions of the horizontal axis and the vertical axis, a workpiece rotation angle, a distance in the horizontal direction between a workpiece rotation center and a tool rotation center, and a distance in the vertical direction between the workpiece rotation center and the tool rotation center in graphic coordinates are calculated from a program command value, and a tool machining path relative to the workpiece is displayed on a graphic screen based on these calculated data pieces. With this configuration, tool operation can be easily and accurately checked.

In Patent Document 4, a tool trajectory and the magnitude and direction of a load during machining are simultaneously displayed as vectors so that transition in the magnitude and direction of the load on the tool path can be visually checked. Accordingly, a cause for an abnormal load and the location thereof can be easily specified.

Patent Document 1: Japanese Unexamined Patent Application, Publication No. H3-58202

Patent Document 2: Japanese Unexamined Patent Application, Publication No. H6-59717

Patent Document 3: Japanese Unexamined Patent Application, Publication No. H8-194514

Patent Document 4: Japanese Unexamined Patent Application, Publication No. 2014-126939

DISCLOSURE OF THE INVENTION

Problems to be Solved by the Invention

Although a technique of displaying the relationship between the machining program and the machining position or situation has been known, there has been no technique of displaying the relationship such that a user grasps, at a glance, where on the machining program directly relates to a particular position on the machining trajectory or, conversely, where on the machining trajectory directly relates to a particular location on the machining program. In order to quickly correct the machining program upon occurrence of a machining defect for production without efficiency degradation, there has been a demand for quickly grasping the relationship between the machining program and the position on the machining trajectory.

For these reasons, it is an object to display, on a display device capable of simultaneously displaying a machining program and a machining trajectory, a correspondence relationship between a particular location on the machining program and a particular position on the machining trajectory so that such a correspondence relationship can be quickly grasped.

Means for Solving the Problems

In order to solve the above-described problems, the display device of the present disclosure includes a position data acquirer that acquires tool position data, a machining program acquirer that acquires a machining program, an associated data saver that saves the tool position data acquired by the position data acquirer and a character string of the machining program acquired by the machining program acquirer in association with each other, a machining trajectory display that calculates a tool machining trajectory from the tool position data acquired by the position data acquirer and displays the tool machining trajectory, a machining trajectory selector that selects a portion on the machining trajectory from the tool machining trajectory displayed on the machining trajectory display, an associated portion selector that selects a program block including the machining program character string saved in the associated data saver in association with the portion, which has been selected by the machining trajectory selector, on the machining trajectory, and a machining program display that displays, on the displayed machining program, the program block selected by the associated portion selector distinctively from other character strings.

Effects of the Invention

According to the display device of the present disclosure, the correspondence relationship between the particular location on the machining program and the particular position on the machining trajectory is displayed so that such a correspondence relationship can be quickly grasped. Thus, even in a case where a machining defect has bees caused, the machining program can be quickly corrected for production without machining efficiency degradation.

BRIEF DESCRIPTION OF THE DRAWINGS

FIG. 4 is a view showing a machining program displayed on the display device of the present invention;

FIG. 6 is a view showing another example of the association between the tool position data and the machining program; and FIG. 7 is a flowchart of a process of displaying the tool machining trajectory and the machining program in association with each other.

PREFERRED MODE FOR CARRYING OUT THE INVENTION

Hereinafter, an embodiment of the present disclosure will be described in detail with reference to the drawings.

Figure 1:
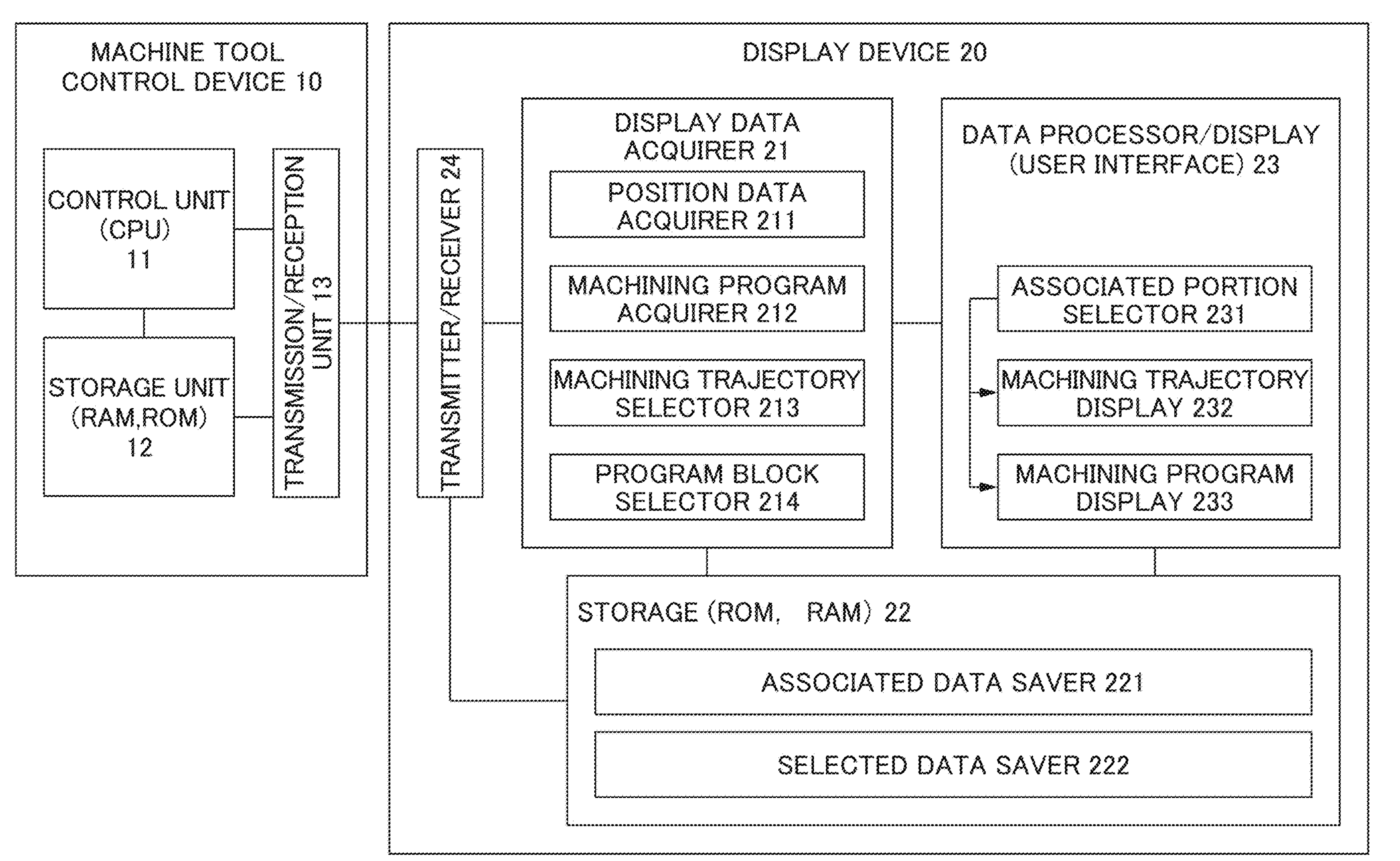
FIG. 1 is a block diagram showing the configuration of a display device of a machine tool of the present invention.

FIG. 1 is a block diagram showing the configuration of a display device of a machine tool of the present disclosure. A machine tool control device 10 is a device that controls operation of the machine tool, and includes a control unit (CPU) 11 having a microcomputer, etc., a storage unit 12 having a RAM/ROM, etc., and a transmission/reception unit 13. For example, the ROM of the storage unit 12 stores a machining program for providing an operation command to the machine tool, and the RAM of the storage unit 12 stores taught tool position data on the machine tool, etc.

A display device 20 is a device that displays the machining program for the machine tool and a machining trajectory of a tool of the machine tool, and has a display data acquirer 21, a storage 22 with a ROM/RAM, etc., a date processor/display 23, and a transmitter/receiver 24.

The display data acquirer 21 is a component that acquires data to be displayed from the machine tool control device 10 and the display device 20 which is also a user interface, and includes a position data acquirer 211, a machining program acquirer 212, a machining trajectory selector 213, and a program block selector 214.

The tool position data on the machine tool, i.e., position data on the tool according to a command value of the machining program, is sent from the machine tool control device 10 to the position data acquirer 211 via the transmission/reception unit 13 of the machine tool control device 10 and the transmitter/receiver 24 of the display device 20. The tool position data is data obtained in such a manner that tool information such as the diameter, length, and tip end shape of the tool is added to position data on a feed shaft. The tool position data acquired by the position data acquirer 211 is, as described later, saved in association with data such as a character string and index of the machining program, and is used in calculation of the tool machining trajectory.

The character string of the machining program and the index data are sent from the machine tool control device 10 to the machining program acquirer 212 via the transmission/reception unit 13 of the machine tool control device 10 and the transmitter/receiver 24 of the display device 20. Some machining programs have indices called N-numbers and each assigned to program character strings (program blocks) by a program user (a machine user, a machine builder), others do not. A technique of automatically assigning indices (e.g., program line numbers) to a program, to which no indices are assigned by the user, by the machine tool control device 10 for the sake of convenience in management has also been known.

The machining trajectory selector 213 acquires data on a particular portion selected on the displayed tool machining trajectory. As a side note, when the user selects a particular portion of interest on the tool machining trajectory displayed on a later-described machining trajectory display 232, the machining trajectory selector 213 acquires data on the selected portion on the tool machining trajectory, and then, such data is saved in a later-described selected data saver 222 of the storage 22. For the acquired and saved portion on the tool machining trajectory, a corresponding (associated) character string (program block) of the machining program is obtained, and is displayed on a machining program display 233 of the data processor/display 23, as described later.

The program block selector 214 acquires data on a particular character string (program block) selected on the displayed machining program. As a side note, when the user selects a character string (program block) of interest on the machining program displayed on the later-described machining program display 233, the program block selector 214 acquires data on the selected program block, and then, such data is saved in the later-described selected data saver 222 of the storage 22. For the acquired and saved program block, a corresponding (associated) portion on the tool machining trajectory is obtained, and is displayed on the machining trajectory display 232 of the data processor/display 23, as described later.

The storage 22 has storage devices such as a RPM and a RAM. For example, the ROM stores a program (application) for drawing the tool machining trajectory from the tool position data and data on a display form (design) on the display device 20, and the RAM saves various types of display data acquired by the display device 20, etc. The storage 22 includes an associated data saver 221 and the selected data saver 222.

In the associated data saver 221, the tool position data acquired by the position data acquirer 211 and the program block (the machining program character string itself or the index of the machining program) acquired by the machining program acquirer 212 are stored as a data set acquired simultaneously, and therefore, these pieces of data are saved as associated data.

In the selected data saver 222, the data, which is acquired by the machining trajectory selector 213, on the portion selected on the tool machining trajectory on the machining trajectory display 232 and the data, which is acquired by the program block selector 214, on the program block selected on the machining program displayed on the machining program display 233 are saved.

The data processor/display 23 is a component that performs various types of arithmetic processing or data processing for forming final display data from various types of data acquired by the display data acquirer 21 to display the formed data or that displays the acquired data in its original form. The user can select a location of interest on the tool machining trajectory or the machining program displayed on the data processor/display 23, and therefore, it can be said that the data processor/display 23 also has a user interface function. The data processor/display 23 includes an associated portion selector 231, the machining trajectory display 232, and the machining program display 233.

The associated portion selector 231 obtains a program block of the machining program corresponding to the portion, which is of interest to the user, acquired by the machining trajectory selector 213, and saved in the selected data saver 222, on the tool machining trajectory with reference to the association between the tool position data and the machining program data in the associated data saver 221. Moreover, the associated portion selector 231 obtains a portion, which corresponds to a program block of interest to the user, acquired by the program block selector 214, and saved in the selected data saver 222, on the tool machining trajectory with reference to the association between the tool position data and the machining program data in the associated data saver 221.

The machining trajectory display 232 displays the tool machining trajectory calculated based on the tool position data acquired by the position data acquirer 211, and on the entirety (or a large portion) of the displayed machining trajectory, displays the particular portion obtained (selected) on the tool machining trajectory by the associated portion selector 231, e.g., in a color for distinguishing such a portion from other portions. On the tool machining trajectory displayed on the machining trajectory display 232, the user can select a portion of interest with, e.g., a pointer, and the selected data is sent to the machining trajectory selector 213.

The machining program display 233 displays the entirety (or a large portion) of the machining program acquired by the machining program acquirer 212, and on the entirety (or a large portion) of the displayed machining program, displays the particular program block obtained (selected) by the associated portion selector 231, e.g., in a highlighted form for distinguishing such a portion from other portions. On the machining program displayed on the machining program display 233, the user can select a program block of interest with, e.g., a cursor, and the selected data is sent to the program block selector 214.

Figure 2:
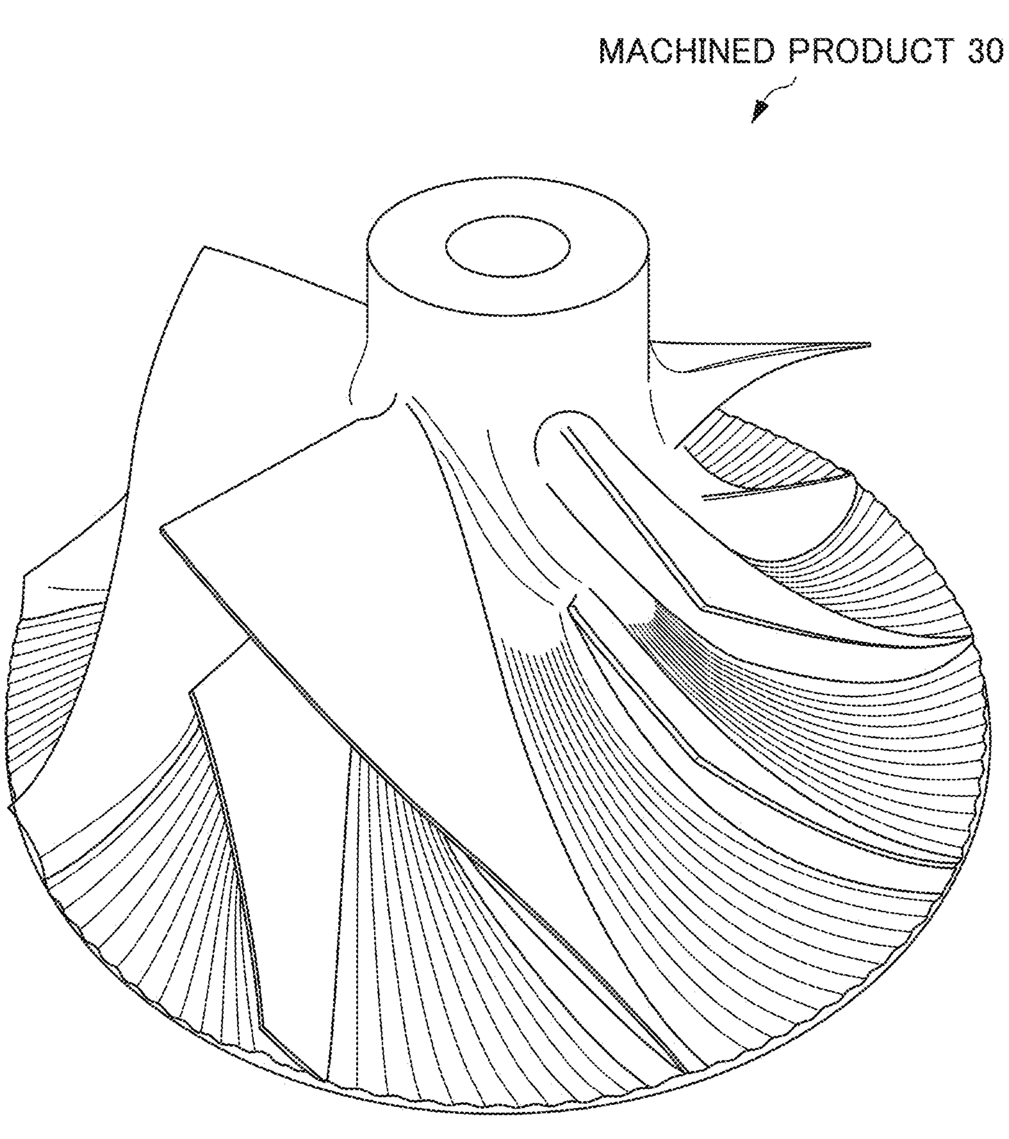
FIG. 2 is a view showing a machined product obtained by the machine tool of the present invention.
Figure 3:
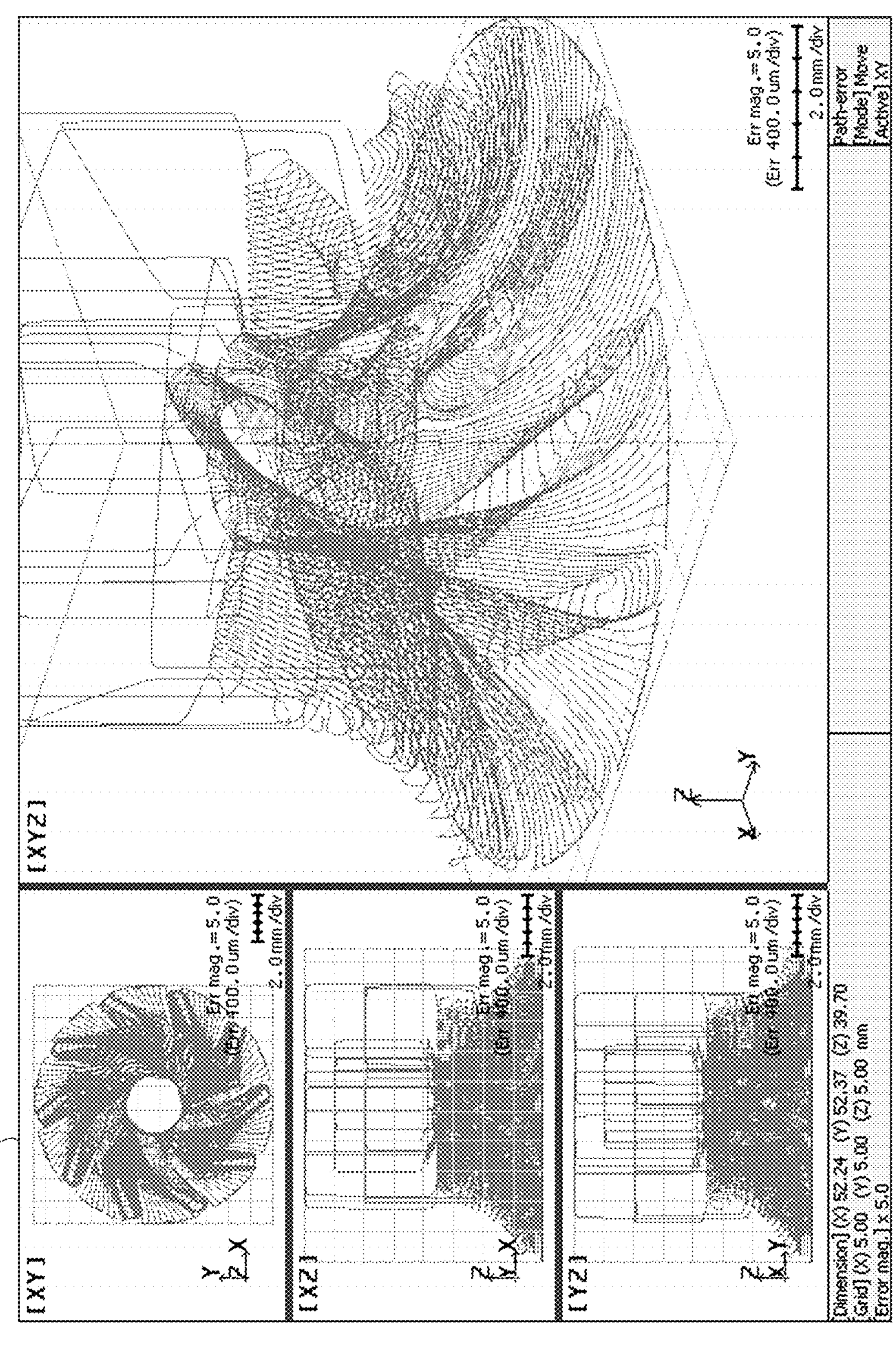
FIG. 3 is a view showing a tool machining trajectory displayed on the display device of the present invention.

Next, FIG. 2 shows, as an illustrative embodiment, one example of a machined product 30 obtained by the machine tool. A tool machining trajectory, which is displayed on the display device 20, for the machined product 30 is shown in FIG. 3, and a displayed machining program is shown in FIG. 4. As the displayed tool machining trajectory of FIG. 3, a three-dimensional machining trajectory is displayed on the right side, and two-dimensional machining trajectories as viewed in an XY plane, an XZ plane, and a YZ plane are displayed in this order from the top on the left side. As the displayed machining program of FIG. 4, a portion of the machining program including character strings within a particular range is displayed.

Next, a technique of saving the tool machining trajectory and the machining program in association with each other according to a machining program acquisition method will be described with reference to the drawings of the tool machining trajectory and the machining program displayed on the display device. As described above, some machining programs have indices called N-numbers and each assigned to program blocks by a program user (a machine user, a machine builder), others do not. As a method for acquiring the machining program by the display device, there are a technique of acquiring data on a program character string (program block) of the machining program every time the tool position data is sent from the machine tool control device 10 and a technique of acquiring the index of the machining program every time the tool position data is sent and separately acquiring a program character string of the machining program.

Figure 5:
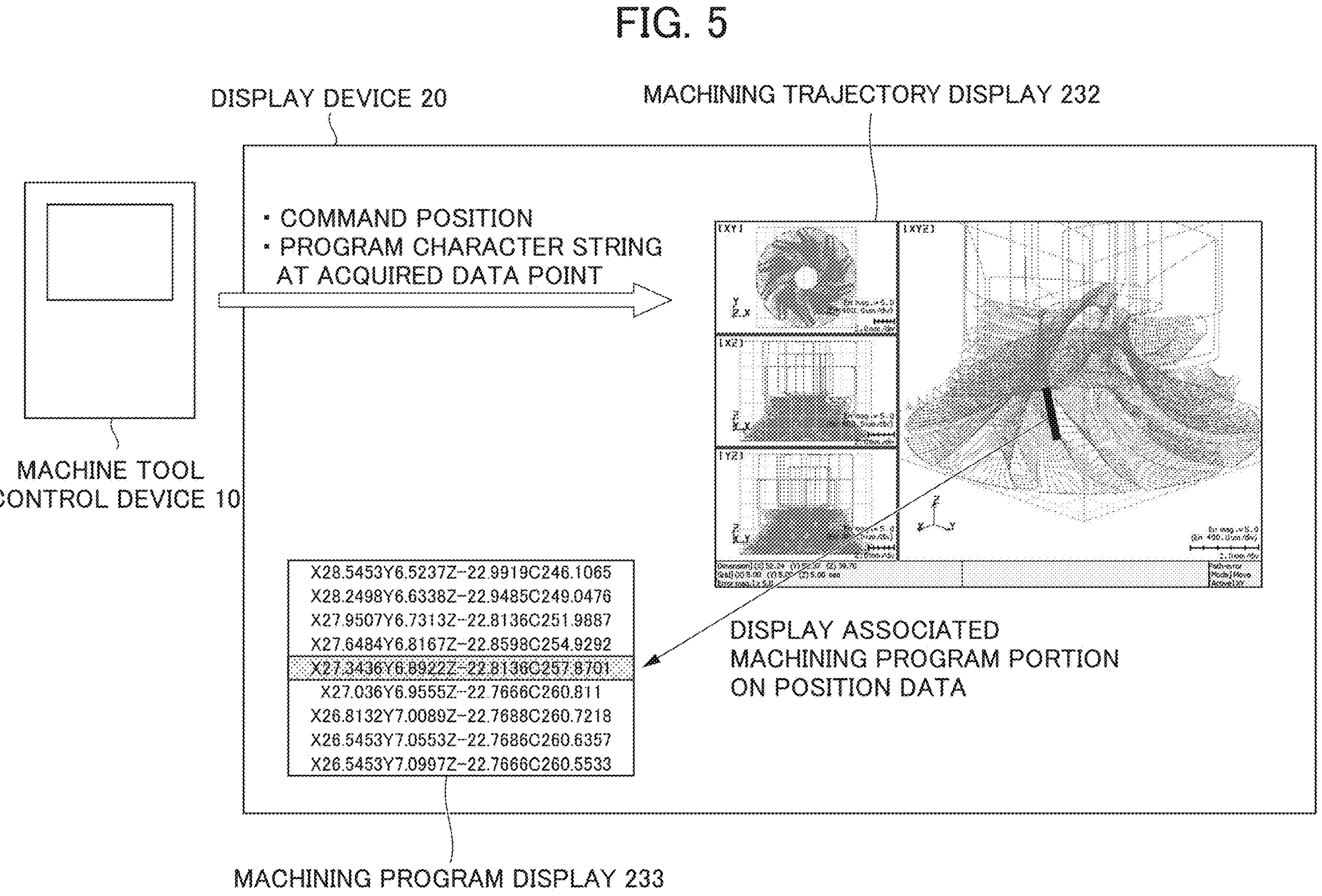
FIG. 5 is a view showing one example of an association between tool position data and the machining program.

FIG. 5 shows a data association method in a case of reading the machining program together with the data on the tool position on the machining trajectory to acquire the machining program. That is, while a command position (position data) and a machining program character string (program block) at an acquired data point are received from the machine tool and are associated with the data on the tool position on the machining trajectory, the machining program character string is sequentially stored. Eventually, the entire machining program is acquired, and the data on the tool position on the machining trajectory and the program block are saved in association with each other.

On the other hand, FIG. 6 shows a method for reading and acquiring the machining program separately from the data on the tool position on the machining trajectory. In this method, a command position (position data) and the index of the machining program at an acquired data point are received from the machine tool, and the data on the tool position on the machining trajectory and the index of the machining program are associated with each other. Meanwhile, the machining program including the indices is read from the machine tool. Then, the data on the tool position on the machining trajectory and a corresponding program block are saved in association with each other via the index.

In the method in which the machining program is read and acquired together with the data on the tool position on the machining trajectory, the character string of the machining program needs to be read at each point of time of acquisition of the data on the tool position on the machining trajectory, and for this reason, there is a problem that it takes time to acquire the data on the entire machining program associated with the data on the tool position on the machining trajectory. On the other hand, in the method in which the machining program is read and acquired separately from the data on the tool position on the machining trajectory, only the index may be read at each point of time of acquisition of the data on the tool position on the machining trajectory, and the entire machining program may be read separately. Thus, the data with the association between the data on the tool position on the machining trajectory and the machining program can be quickly saved. In terms of the speed of data reading/saving, the method using the index is better.

In a case where the machining program has no indices, the method in which the machining program is read and acquired together with the data on the tool position on the machining trajectory is inevitably employed. In other words, the method in which the machining program is read and acquired together with the data on the tool position on the machining trajectory is applicable to the machining program having no indices, and is higher in versatility.

Next, a technique of displaying the tool machining trajectory and the machining program in association with each other in the present disclosure will be described with reference to a flowchart of FIG. 7. As shown in FIG. 7, the tool position data and the machining program are first acquired from the machine tool control device (Step St1), and the tool position data and the machining program character string are saved in association with each other (Step St2).

As described above, the tool position data and the machining program (character string) are acquired simultaneously in some cases, and the tool position data and the index of the machining program are acquired simultaneously and the machining program (character string) itself is separately acquired in other In a case of simultaneously acquiring the tool position data and the machining program character string, the tool position data and the machining program character string (program block) at the time of acquisition are saved in association with each other. On the other hand, in a case of acquiring the machining program (character string) itself separately from the tool position data, the tool position data and the index of the machining program are saved in association with each other, and accordingly, the tool position data and the machining program are associated with each other. That is, at the time of acquisition of the tool position data and the machining program from the machine tool control device, the tool position data and the machining program are saved in association with each other.

Next, the tool machining trajectory is calculated from the tool position data and is displayed (Step St3). The displayed tool machining trajectory includes the three-dimensional entire machining trajectory and the two-dimensional machining trajectories displayed in three directions, i.e., directions from above, the front, and the side.

Next, it is determined, as a purpose for displaying an associated portion, whether a: the user intends Co obtain a program block corresponding to a particular portion on the tool machining trajectory, i.e., the user selects a portion on the machining trajectory to display a corresponding program block, or b: the user intends to obtain a particular portion, which corresponds to a particular program block, on the tool machining trajectory, i.e., the user selects a program block to display a corresponding portion on the machining trajectory (Step St4).

In a case of selecting the portion on the machining trajectory to display the corresponding program block, i.e., a case where a has been selected in Step St4, the processing transitions to Step St5. In a case of selecting the program block to display the corresponding portion on the machining trajectory, i.e., a case where b has been selected in Step St4, the processing transitions to Step St8.

In Step St5, the user selects the portion on the displayed tool machining trajectory. This step is performed by the user via the display device (user interface) (e.g., the user traces a predetermined area on the tool machining trajectory with the pointer).

Then, on the display device, the program block of the machining program associated with the selected portion on the machining trajectory is selected (Step St6), and the selected program block is, by, e.g., highlighting or coloring of the corresponding character string, displayed distinctively from other character strings on the machining program (Step St7). In this manner, the user can grasp the program block corresponding to (associated with) the target portion on the tool machining trajectory, and the purpose is accomplished. Then, this flow ends.

In Step St8, the user selects the program block of interest on the displayed machining program. This step is performed by the user via the display device (user interface) (e.g., the user moves the cursor to highlight a predetermined area on the machining program).

Then, on the display device, the portion, which is associated with the selected program block, on the tool machining trajectory is selected (Step St9), and the selected portion on the tool machining trajectory is, by, e.g., coloring of the corresponding location, displayed distinctively from other portions on the tool machining trajectory (Step St10). In this manner, the user can grasp the Portion, which corresponds to (associated with) the target program block, on the tool machining trajectory, and the purpose is accomplished. Then, this flow ends.

According to the display device and method of the invention of the present disclosure, a relationship between axis operation of the machine, i.e., tool operation, and the machining program is easily grasped. Thus, if a machining defect has been caused during a process in the machine tool, such as cutting/griding, the user easily grasps where on the machining program the machining defect has been caused. Thus, improvement in work efficiency is expected by the display device and method of the invention of the present disclosure.

Implementation of the present invention has been described above with reference to the illustrative embodiment, but the present invention is not limited to such an illustrative embodiment and can be implemented in various forms without departing from the spirit of the present invention.

EXPLANATION OF REFERENCE NUMERALS

10 Machine Tool Control Device
11 Control Unit (CPU)
12 Storage Unit (RAM, ROM)
13 Transmission/Reception Unit
20 Display Device
21 Display Data Acquirer
211 Position Data Acquirer
212 Machining Program Acquirer
213 Machining Trajectory Selector
214 Program Block Selector
22 Storage (ROM, RAM)
221 Associated Data Saver
222 Selected Data Saver
23 Data Processor/Display (User Interface)
231 Associated Portion Selector
232 Machining Trajectory Display
233 Machining Program Display
24 Transmitter/Receiver
30 Machined Product

The invention claimed is:

1. A display device comprising a processor, the processor being configured to:

acquire tool position data;

acquire a machining program;

save the acquired tool position data and an index of the machining program in association with each other;

calculate a tool machining trajectory from the acquired tool position data and displays the tool machining trajectory;

select a portion on the machining trajectory from the displayed tool machining trajectory select a program block of the machining program corresponding to the index of the machining program saved in association with the portion, which has been selected, on the machining trajectory; and display, on the displayed machining program, the selected program block differently from other character strings, wherein the processor acquires an index of the machining program every time the processor acquires the tool position data, and separately acquires the machining program independently of acquisition of the tool position data, and the processor saves, at each point of time of acquisition, the acquired position data and the acquired machining program index in association with each other.

2. The display device comprising a processor according to claim 1, the processor being further configured to:

select a program block of the machining program, select a portion on the machining trajectory, which is saved in association with the selected program block, and display the selected portion, on the machining trajectory differently from other displayed portions on the machining trajectory.

3. A display method by a processor provided in a display device, the method being configured to:

acquire tool position data;

acquire a machining program;

save the acquired tool position data and an index of the machining program in association with each other;

calculate a tool machining trajectory from the acquired tool position data and display the tool machining trajectory;

select a portion on the displayed tool machining trajectory;

select a program block of the machining program corresponding to the index of the machining program associated with the selected portion on the machining trajectory; and display, on the displayed machining program, the selected program block, wherein an index of the machining program is acquired every time the tool position data is acquired, and the machining program is separately acquired independently of acquisition of the tool position data, and the acquired tool position data and the acquired machining program index are, at each point of time of acquisition, saved in association with each other.

4. The display method by a processor provided in a display device according to claim 3, the method being further configured to:

select a program block of the machining program;

select a portion on the machining trajectory, which is associated with the selected program block; and display the selected portion on the displayed tool machining trajectory.

* * * * *